United States Patent
Li et al.

(10) Patent No.: US 12,050,388 B2
(45) Date of Patent: Jul. 30, 2024

(54) ARRAY SUBSTRATE, DISPLAY PANEL, AND METHOD OF FABRICATING ARRAY SUBSTRATE

(71) Applicant: HKC CORPORATION LIMITED, Shenzhen (CN)

(72) Inventors: Hui Li, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/079,779

(22) Filed: Dec. 12, 2022

(65) Prior Publication Data

US 2023/0213827 A1  Jul. 6, 2023

(30) Foreign Application Priority Data

Dec. 31, 2021 (CN) .......................... 202111675434.8

(51) Int. Cl.
G02F 1/1362 (2006.01)
G02F 1/1333 (2006.01)
G02F 1/1343 (2006.01)

(52) U.S. Cl.
CPC .. G02F 1/136286 (2013.01); G02F 1/133357 (2021.01); G02F 1/134309 (2013.01); G02F 1/136222 (2021.01)

(58) Field of Classification Search
None
See application file for complete search history.

(56) References Cited

U.S. PATENT DOCUMENTS

| 8,339,555 B2 * | 12/2012 | Hwang | G02F 1/134363 349/141 |
| 10,804,345 B2 * | 10/2020 | Li | H10K 50/813 |
| 2006/0044449 A1 * | 3/2006 | Sakoh | H01L 27/14685 348/336 |
| 2009/0231475 A1 * | 9/2009 | Akram | H01L 27/14685 348/E5.091 |
| 2010/0245732 A1 * | 9/2010 | Lee | G02B 5/223 313/112 |

(Continued)

FOREIGN PATENT DOCUMENTS

| CN | 108983516 A | * 12/2018 | ....... G02F 1/134309 |
| CN | 108983516 A | 12/2018 | |

(Continued)

*Primary Examiner* — Ryan Crockett

(57) ABSTRACT

An array substrate, a display panel and a method of fabricating the array substrate are disclosed. The array substrate is applied to the display panel, and includes a substrate, multiple scan lines, multiple data lines, a color filter layer, and a planarization layer. The color filter layer at least includes a plurality of first color filters, at least one of which has a raised portion in a region adjacent to the respective data line, and a middle portion in a region away from the respective data line, where a thickness of the raised portion is greater than that of the middle portion. The planarization layer defines at least one first elongated groove corresponding to the raised portion and extending along an extending direction of the data lines. The pixel electrode branch and/or the common electrode branch disposed corresponding to the raised portion is disposed in the respective first elongated groove.

17 Claims, 7 Drawing Sheets

(56) References Cited

U.S. PATENT DOCUMENTS

| | | | | |
|---|---|---|---|---|
| 2011/0299024 A1* | 12/2011 | Lee | .................. | G02F 1/1368 |
| | | | | 29/829 |
| 2013/0077031 A1* | 3/2013 | Kim | .................. | G02F 1/133512 |
| | | | | 438/30 |
| 2015/0049288 A1* | 2/2015 | Yeh | .................. | G02F 1/1393 |
| | | | | 349/138 |
| 2015/0055065 A1* | 2/2015 | Shin | .................. | G02F 1/133788 |
| | | | | 349/138 |
| 2016/0313618 A1* | 10/2016 | Lee | .................. | G02F 1/136227 |
| 2016/0370660 A1* | 12/2016 | Zhao | .................. | G02F 1/13439 |
| 2017/0081588 A1* | 3/2017 | Huh | .................. | G02F 1/134363 |
| 2018/0157101 A1* | 6/2018 | Wu | .................. | G02F 1/133514 |
| 2019/0324319 A1* | 10/2019 | Park | .................. | G02F 1/1339 |
| 2020/0091247 A1* | 3/2020 | Lee | .................. | G06F 3/0443 |
| 2020/0312915 A1* | 10/2020 | Sun | .................. | H10K 71/00 |
| 2021/0132374 A1* | 5/2021 | Usukura | .................. | G02B 27/0172 |

FOREIGN PATENT DOCUMENTS

| | | | |
|---|---|---|---|
| CN | 110806666 A | | 2/2020 |
| KR | 100443756 B1 | * | 12/2004 |

* cited by examiner

ARRAY SUBSTRATE, DISPLAY PANEL, AND METHOD OF FABRICATING ARRAY SUBSTRATE

CROSS-REFERENCE TO RELATED APPLICATIONS

This application claims the priority and benefit of Chinese patent application 2021116754348, titled "Array Substrate, Display Panel, and Method of Fabricating Array Substrate" and filed Dec. 31, 2021, with China National Intellectual Property Administration, the entire contents of which are incorporated herein by reference.

TECHNICAL FIELD

The present application relates to the field of display technology, and in particular, to an array substrate, a display panel and a method of fabricating the array substrate.

BACKGROUND

The description provided in this section is intended for the mere purpose of providing background information related to the present application but doesn't necessarily constitute prior art.

Nowadays, the mainstream TFT-LCD display panel in the market has been widely used due to its advantages of thin body, power saving and low price.

In particular, a liquid crystal display panel with an array substrate fabricated by COA (color filters fabricated on array substrate) technology is widely used. However, in the COA process, due to the leveling issue of the color filter material, a concave structure with a low middle and high sides will appear. Even if a planarization layer is used for planarization, there will still be a concave tendency. Therefore, the arrangement of the pixel electrode and/or the common electrode disposed on the planarization layer on this concave topography will result in an uneven electric field, leading to the phenomenon of light leakage in the dark state of the liquid crystal display panel. Therefore, there is a need to propose a new design to improve the problem of light leakage in the dark state of the liquid crystal display panel.

SUMMARY

In view of the above, it is therefore a purpose of the present application to provide an array substrate, a display panel and a method of fabricating the array substrate. By arranging the branches of the pixel electrode or the branches of the common electrode in the first elongated groove, the upper surfaces of the pixel electrode and the common electrode are flush with each other, which is beneficial to the stabilization of the electric field and reduces the light leakage in the dark state.

The present application discloses an array substrate, which is applied to a display panel. The array substrate includes a substrate, a plurality of scan lines, a plurality of data lines, a color filter layer, and a planarization layer. The plurality of scan lines and the plurality of data lines are arranged on the substrate, and are arranged in a crisscross pattern to form a plurality of pixel regions. The color filter layer includes a plurality of color filters of different colors and is arranged corresponding to the pixel regions. The planarization layer is arranged on the color filter layer. The pixel region is further provided with a pixel electrode and a common electrode. At least one of the pixel electrode and the common electrode is disposed on the planarization layer. The pixel electrode includes a plurality of pixel electrode branches that are connected to each other and arranged at intervals, and/or the common electrode includes a plurality of common electrode branches that are connected to each other and arranged at intervals. The color filter layer at least includes a plurality of first color filters. At least one region of the first color filter adjacent to the respective data line has a raised portion, and a region far away from the data line has a middle portion, where the thickness of the raised portion is greater than the thickness of the middle portion. The planarization layer is provided with at least one first elongated groove corresponding to the raised portion. The first elongated groove extends along the extending direction of the data lines. The pixel electrode branch and/or the common electrode branch disposed corresponding to the raised portion are disposed in the respective first elongated groove(s).

Optionally, a plurality of the first elongated grooves are provided, and the depths of the plurality of first elongated grooves gradually decrease from the raised portion to the middle portion. The pixel electrode branches and/or the common electrode branches disposed corresponding to the raised portions are all disposed in the first elongated grooves.

Optionally, the planarization layer is also provided with at least one first elongated groove corresponding to the middle portion. Corresponding to the middle portion, the depth of the first elongated groove is equivalent to the thickness of the pixel electrode branch or the common electrode branch. Corresponding to the raised portion, the depth of the first elongated groove is greater than the thickness of the pixel electrode branch and/or the common electrode branch. The pixel electrode branches and/or the common electrode branches are all disposed in the first elongated grooves.

Optionally, the color filter layer further includes at least one second color filter, and the thickness of the second color filter is uniform. The planarization layer is provided with a plurality of second elongated grooves corresponding to the second color filter. The second elongated groove extends along the extending direction of the data lines. The depths of the plurality of second elongated grooves are the same. The pixel electrode branches and/or the common electrode branches disposed corresponding to the second color filter are disposed in the respective second elongated grooves.

Optionally, the depth of the second elongated groove is equivalent to the thickness of the pixel electrode branch and/or the common electrode branch.

Optionally, the display panel is a fringe field switch technology display panel. One of the pixel electrode and the common electrode is disposed on the planarization layer. The other one of the pixel electrode and the common electrode is an entire single surface integral electrode, and is arranged between the substrate and the color filter layer. The pixel electrode and the common electrode form a fringe electric field. The pixel electrode branch and/or the common electrode branch disposed corresponding to the raised portion are disposed in the first elongated grooves.

Optionally, the display panel is an in-plane switching type display panel. Both the pixel electrode and the common electrode are arranged on the planarization layer. The plurality of pixel electrode branches and the plurality of common electrode branches are arranged alternately at intervals to form a horizontal electric field. The pixel electrode branch and/or the common electrode branch disposed corresponding to the raised portion are disposed in the first elongated groove.

Optionally, the array substrate further includes a second planarization layer, and the second planarization layer is disposed overlying the pixel electrode and/or the common electrode. A surface of the second planarization layer away from the pixel electrode and/or the common electrode is parallel to the substrate.

The present application further discloses a display panel, including an counter substrate and any one of the array substrates disclosed in the present application. The counter substrate and the array substrate are aligned and bonded together to form a cell.

The present application further discloses a method of fabricating an array substrate, which is used to fabricate any one of the array substrates disclosed in the present application, including the steps of:

providing a substrate, fabricating a plurality of scan lines and a plurality of data lines on the substrate in sequence, which are arranged in a crisscross pattern to form a plurality of pixel regions;

forming a plurality of second color filters corresponding to the pixel regions, and finally forming a plurality of first color filters to form a color filter layer;

forming a planarization layer on the color filter layer, and defining at least one first elongated groove in the planarization layer corresponding to at least one of the first color filters near the respective data line area;

forming a plurality of pixel electrode branches and a plurality of common electrode branches on the planarization layer corresponding to the first color filter and the second color filter, where at least one formed pixel electrode branch and/or the common electrode branch is arranged in the respective first elongated groove, so as to form a pixel electrode and a common electrode in each pixel region.

Compared with the solution that the surfaces of the pixel electrode and the common electrode together form a concave profile such that the low electric field levelness causes light leakage in the dark state, in the present application at least one first elongated groove is provided in the position of the planarization layer corresponding to the raised portion of the first color filter, the pixel electrode branches and/or the common electrode branches at the position where the thickness of the first color filter is large are arranged in the respective first elongated grooves, so that the upper surfaces of the pixel electrode and the common electrode are nearly flush, which is beneficial to improve the stability of electric field, especially the stability of the horizontal component of the electric field, thus reducing the dark-state light leakage phenomenon of the display panel. In addition, the first elongated groove is defined in the planarization layer, which changes the topography of the planarization layer, so that the average thickness of the portion of the planarization layer corresponding to the raised portion becomes smaller, which is beneficial to improve the penetration rate or transmittance of the edge positions. In addition, since the raised pixel electrodes and the common electrodes are now sunk, the thickness uniformity of the liquid crystal layer is improved to a certain extent, which is also beneficial to improve the display effect of the display panel and improve the market competitiveness of the product.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
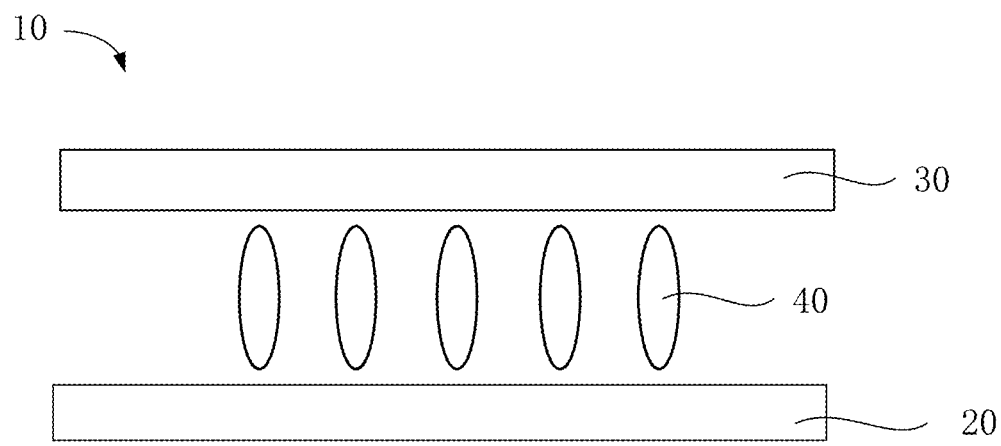
FIG. 1 is a schematic diagram of a display panel according to an embodiment of the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a display panel according to an embodiment of the present application. Referring to FIG. 1, the present application discloses a display panel 10, including an counter substrate 30 and an array substrate 20. The counter substrate 30 and the array substrate 20 are aligned and bonded together to form a cell.

The display panel 10 of the present application may be a liquid crystal display panel 10, and may be a mobile phone, a TV, a computer, or other products. The display panel 10 includes an array substrate 20 and an counter substrate 30. In addition, a liquid crystal layer 40 is further arranged between the array substrate 20 and the counter substrate 30, and an electric signal is formed between the array substrate 20 and the counter substrate 30 to drive the liquid crystal to rotate to display a picture. On the other hand, the electric field formed by the display panel 10 of the present application is stable, which can present excellent image quality, thereby improving people's experience.

The present application makes targeted improvements to the array substrate 20 in the display panel 10, specifically as follows.

Embodiment 1

Figure 2:
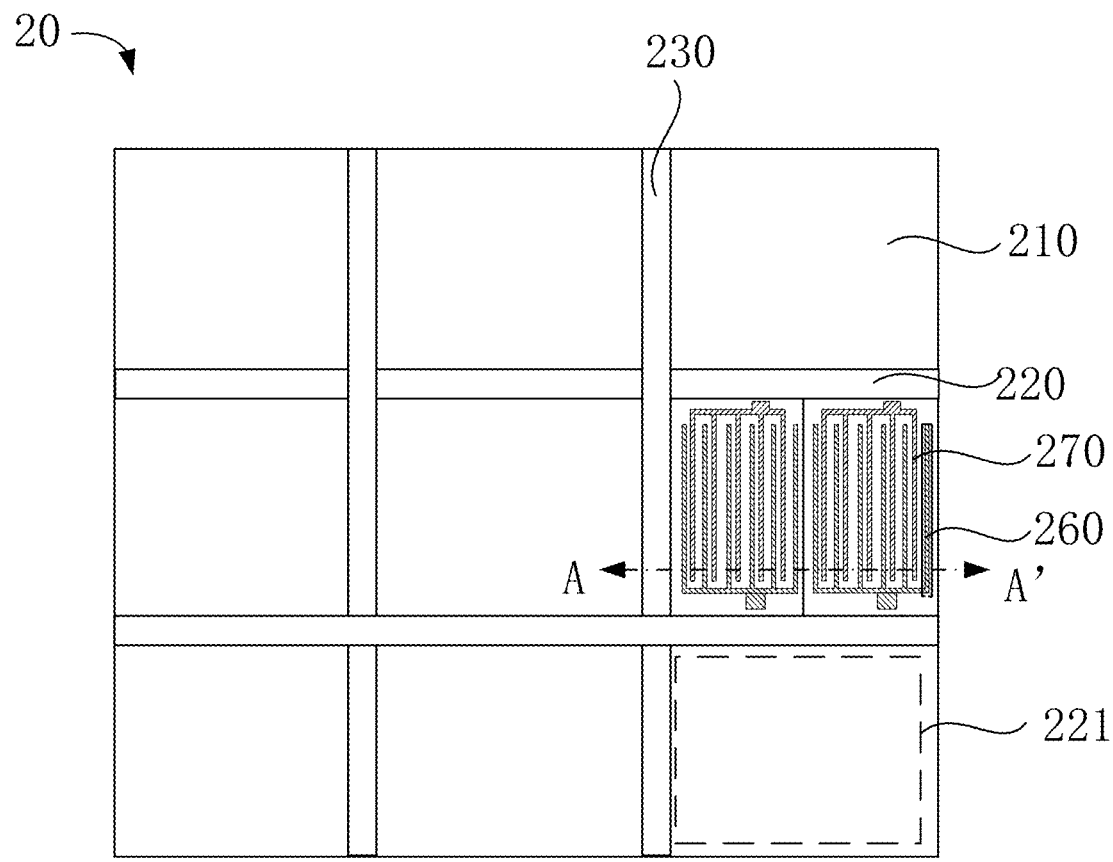
FIG. 2 is a schematic top view of an array substrate according to an embodiment of the present application.
Figure 3:
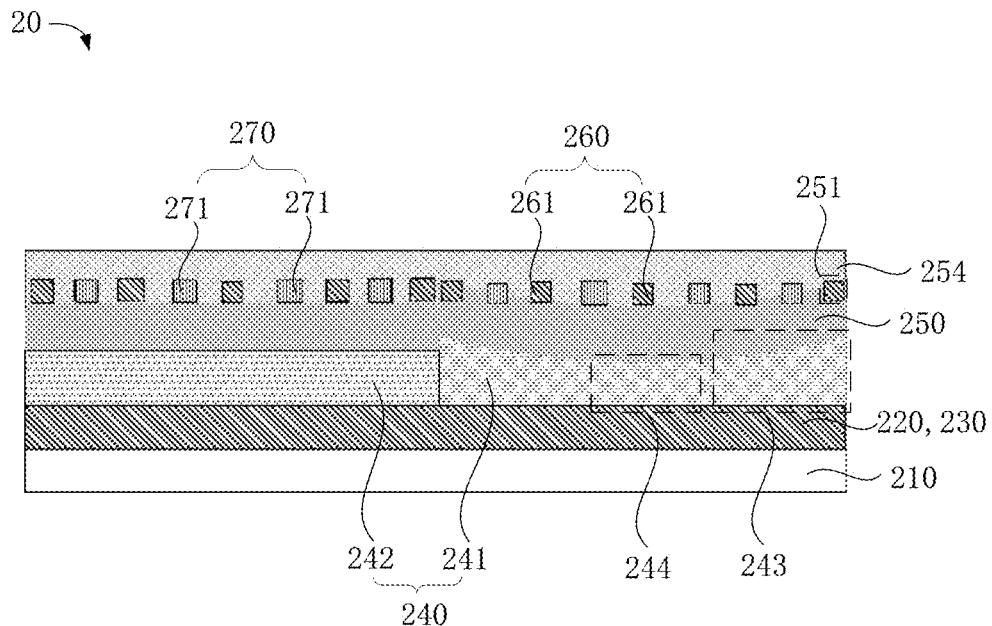
FIG. 3 is a schematic cross-sectional view taken along line A-A' shown in FIG. 2 of the present application.

FIG. 2 is a schematic top view of an array substrate according to an embodiment of the present application. FIG. 3 is a schematic cross-sectional view taken along line A-A' shown in FIG. 2 of the present application. Referring to FIGS. 2 and 3, the present application discloses an array substrate 20, which is applied to a display panel 10. The array substrate 20 includes a substrate 210, a plurality of scan lines 220, a plurality of data lines 230, a color filter layer 240, and a planarization layer 250. The plurality of scan lines 220 and the plurality of data lines 230 are all disposed on the substrate 210, and cross over each other to form a plurality of pixel regions 221. The color filter layer 240 includes a plurality of color filters of different colors, and is arranged corresponding to the pixel regions 221. The planarization layer 250 is disposed on the color filter layer 240. In the pixel region 221 is further disposed a pixel electrode 260 and a common electrode 270. At least one of the pixel electrode 260 and the common electrode 270 is disposed on the planarization layer 250. The pixel electrode 260 includes a plurality of interconnected and spaced apart pixel electrode branches 261, and/or the common electrode 270 includes a plurality of interconnected and spaced apart common electrode branches 271. The color filter layer 240 at least includes a plurality of first color filters 241. At least one first color filter 241 has a raised portion 243 in a region adjacent to the data line 230, and has a middle portion 244 in a region away from the data line 230, and the thickness of the raised portion 243 is greater than that of the middle portion 244. The planarization layer 250 defines at least one first elongated groove 251 corresponding to the raised portion 243, and the first elongated groove 251 extends along the extending direction of the respective data line 230. The pixel electrode branch 261 and/or the common electrode branch 271 disposed corresponding to the raised portion 243 are disposed in the respective first elongated groove 251.

Compared with the solution in which the surfaces of the pixel electrode 260 and the common electrode 270 are concave, and the low electric field levelness causes light leakage in the dark state, in the present application, at least one first elongated groove 251 is defined in the planarization layer 250 corresponding to the raised portion of the first color filter 241, and the pixel electrode branch 261 and/or the common electrode branch 271 at the position where the thickness of the first color filter 241 is large is disposed in the first elongated groove 251, so that the upper surfaces of the pixel electrode 260 and the common electrode 270 tend to be flush, which is beneficial to improving the stability of the electric field, especially the stability of the horizontal component of the electric field, and reducing the dark-state light leakage phenomenon of the display panel 10. In addition, the first elongated groove 251 is defined in the planarization layer 250, which changes the topography of the planarization layer 250, so that the average thickness of the planarization layer 250 corresponding to the edge positions becomes smaller, which is beneficial to improving the penetration rate or transmittance of the edge positions. Furthermore, since the raised pixel electrode 260 and the common electrode 270 are sunk, the thickness uniformity of the liquid crystal layer 40 is improved to a certain extent, which is also beneficial to improving the display effect of the display panel 10 and improving the market competitiveness of the product.

Since the array substrate 20 is fabricated by COA technology, during the fabrication process of the color filter layer 240, due to the leveling property of the color filter, the color filter usually may exhibit a concave phenomenon, especially the color filter formed in the last process is most likely to show a concave trend. The color filter formed in the last process is defined as the first color filter 241, and the color filter formed in the previous process is defined as the second color filter 242, wherein at least one of the first color filters 241 has a concave structure. When the first color filter 241 has a concave structure, the region adjacent to the respective data line 230 forms the raised portion 243, and the region far away from the data line 230 forms the middle portion 244. Furthermore the thickness of the middle portion 244 is small, and the thickness of the raised portion 243 is large, showing a terrain where the middle portion is low and gradually rises to the two edges. The thickness of the raised portion 243 may be larger than that of the middle portion 244 by 0.2 um-0.5 um. In actual production, usually the color filter formed in the last process is a blue color filter, that is, the first color filter 241 is usually a blue color filter. Of course, the color filter formed in the last process can also be a red color filter or a green color filter, depending on the actual production scenario. The middle portion 244 may be defined as a region with the same thickness as the second color filter 242.

In the pixel region 221 is further disposed a pixel electrode 260 and/or a common electrode 270. At least one of the pixel electrode 260 and/or the common electrode 270 is disposed on the planarization layer 250, so that the pixel electrode 260 and the common electrode 270 form an electric field to drive the liquid crystal to rotate. Corresponding to the color filters of different colors, different colors are presented to realize display of a color image. The pixel electrode 260 includes a plurality of interconnected and spaced apart pixel electrode branches 261, and/or the common electrode 270 includes a plurality of interconnected and spaced apart common electrode branches 271. On the planarization layer 250, at least one first elongated groove 251 is disposed corresponding to the raised portion 243, and the first elongated groove 251 extends along the extending direction of the respective data line 230 to accommodate the pixel electrode branches 261 and/or the common electrode branches 271 at corresponding positions, so that the upper surfaces of the pixel electrode 260 and/or the common electrode 270 are flush at the position of the first color filter 241, so as to avoid the upper surface being concave. Flush does not mean completely flush, and technical errors are allowed. For example, when the difference between the heights of the upper surfaces of the pixel electrode 260 and/or the common electrode 270 is smaller than the threshold, it can be considered as flush. Within this threshold, the electric field is stable and does not exhibit significant drive anomalies or display unevenness. The specific threshold can be adjusted depending on the size or specification of the display panel 10 to meet the requirements of electric field stability and reduce light leakage in the dark state.

Figure 4:
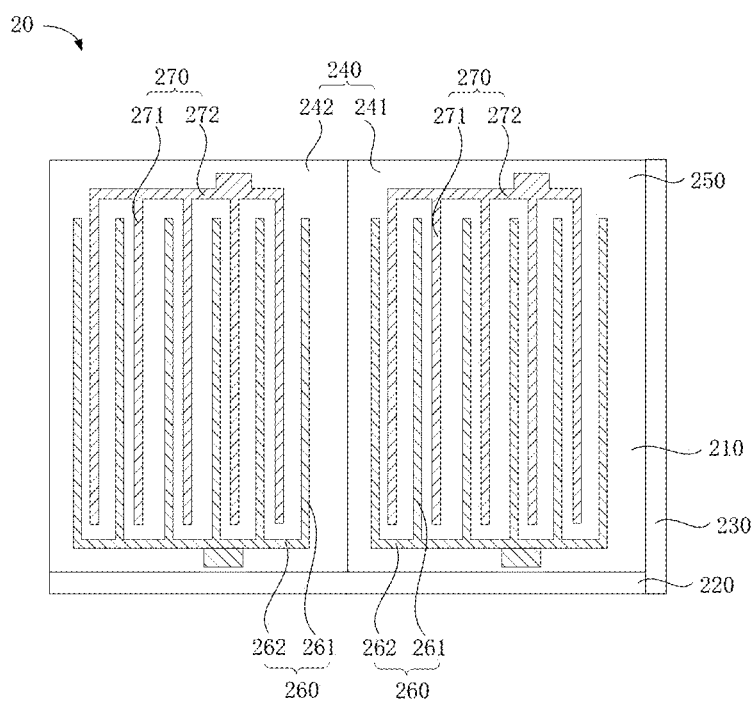
FIG. 4 is a schematic top view of a pixel electrode and a common electrode in a first embodiment of the present application.
Figure 5:
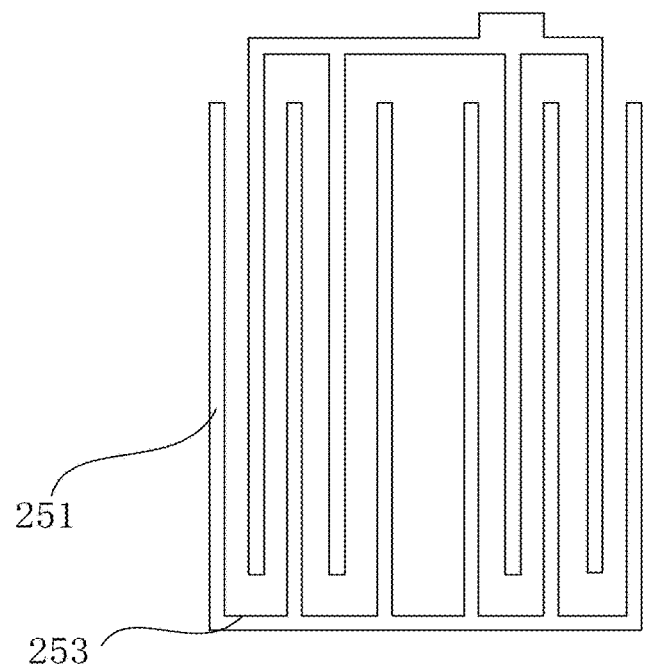
FIG. 5 is a schematic top view of a first elongated groove in the first embodiment of the present application.

FIG. 4 is a schematic top view of a pixel electrode and a common electrode in a first embodiment of the present application. FIG. 5 is a schematic top view of a first elongated groove in the first embodiment of the present application. Referring to FIGS. 4 and 5, it can be seen that the display panel 10 of the present application is an in-plane switching (IPS) display panel 10. Both the pixel electrode 260 and the common electrode 270 are disposed on the planarization layer 250. A plurality of pixel electrode branches 261 and common electrode branches 271 are arranged at intervals to form a horizontal electric field. The pixel electrode branch 261 or the common electrode branch 271 disposed corresponding to the raised portion 243 is disposed in the first elongated groove 251.

In this embodiment, the array substrate 20 is applied to an IPS display panel 10. Both the pixel electrode 260 and the common electrode 270 are disposed on the planarization layer 250. Furthermore, when the display panel 10 is an IPS type display panel, a plurality of pixel electrode branches 261 and a plurality of common electrode branches 271 are alternately arranged at intervals to form a horizontal electric field. The extending direction of each pixel electrode branch 261 and each common electrode branch 271 may be parallel to the extending direction of the data lines 230. Therefore, the first elongated groove 251 may be an elongated rectangle with the same shape as the pixel electrode branch 261 and/or the common electrode branch 271 at the corresponding raised portion 243, and the pixel electrode branch 261 and/or common electrode branch 271 are embedded in the first elongated groove 251 as a whole, to ensure that the upper surfaces of the pixel electrode branches 261 and the common electrode branches 271 are flush. Of course, the first elongated groove 251 can also be a relatively large rectangular groove corresponding to the raised portion 243 to accommodate a plurality of pixel electrode branches 261 and/or common electrode branches 271, which can also ensure that the upper surfaces of the pixel electrode branches 261 and the common electrode branches 271 are flush.

In addition, the width of the first elongated groove 251 can be set to be 2 m to m greater than the width of the pixel electrode branch 261 and/or the common electrode branch 271, so that a gap is defined from the pixel electrode branch 261 and/or the common electrode branch 271 to the sidewall of the first elongated groove 251. The gap can offset errors in the manufacturing process, and prevent the pixel electrode branch 261 and/or the common electrode branch 271 from accumulating or stacking at the groove opening of the first elongated groove 251 because of being too wide thereby resulting in uneven thickness and an uneven electric field.

Specifically, there are provided a plurality of first elongated grooves 251. The depths of the plurality of first elongated grooves 251 gradually decrease in the direction from the raised portion 243 to the middle portion 244. The pixel electrode branches 261 and/or the common electrode branches 271 disposed corresponding to the raised portions 243 are all disposed in the first elongated grooves 251.

Since the first color filter 241 has a concave structure, the thickness of the middle portion 244 is relatively small, and the thickness of the raised portion 243 is relatively large, which generally shows a trend of gradually increasing from the middle to both sides. Therefore, a plurality of first elongated grooves 251 are provided, and the depths of the first elongated grooves 251 are set to gradually decrease in the direction from the raised portion 243 to the middle portion 244. At this time, corresponding to the middle portion 244 of the first color filter 241, at least one pixel electrode branch 261 or common electrode branch 271 is not disposed in the first elongated groove 251. In this way, when the first elongated groove 251 is fabricated, a plurality of first elongated grooves 251 with gradually increasing depths can be sequentially fabricated corresponding to the raised portion 243 based on the surface of the planarization layer 250 corresponding to the middle portion 244 as the reference. The depth of at least one first elongated groove 251 corresponding to the middle portion 244 is 0. The depths of the first elongated grooves 251 corresponding to the raised portions 243 increase sequentially in the direction from the middle position of the first color filter 241 to both sides. In this way, seen in the cross section taken along the extending direction of the scan lines 220, the sidewall of the first elongated groove 251 near the respective data line 230 is relatively high, and the sidewall near the middle is relatively short, so as to ensure that the upper surfaces of the pixel electrode 260 and the common electrode 270 are flush. In this way, the number of the first elongated grooves 251 to be fabricated can also be reduced.

Specifically, each pixel electrode 260 and/or the common electrode 270 is arranged in a comb shape. The pixel electrode 260 further includes a first trunk 262. The plurality of pixel electrode branches 261 are connected to the first trunk 262, and the first trunk 262 extends along the extending direction of the scan lines 220. The common electrode 270 further includes a second trunk 272. The plurality of common electrode branches 271 are connected to the second trunk 272, and the second trunk 272 extends along the extending direction of the scan lines 220. The first trunk 262 is the keel of the pixel electrode 260, and the second trunk 272 is the keel of the common electrode 270. Usually, the array substrate 20 further includes thin film transistors (not shown in the figures). The first trunk 262 of each pixel electrode 260 is connected to the drain electrode of the respective thin film transistor through a via hole to realize electric signal driving. Both the first trunk 262 and the second trunk 272 are located adjacent to the respective scan lines 220. Generally, when the color filter is formed, the thickness of the color filter at the position adjacent to the respective scan line 220 is also greater than that at the middle position. In order to make the upper surfaces of the pixel electrode 260 and the common electrode 270 at different positions flush, the planarization layer 250 further defines a third elongated groove 253 near the scan line 220, and the third elongated groove 253 extends along the extending direction of the scan line 220. Usually, there are at least two third elongated grooves 253, so as to ensure that the first trunk 262 and the second trunk 272 at the position corresponding to a large thickness of the color filter are all disposed in the third elongated grooves 253, so that the upper surfaces of the pixel electrode 260 and the common electrode 270 are more flush, which is conducive to the stability of the electric field.

Furthermore, when the display panel 10 is formed based on the array substrate 20, spacers are also provided, and the spacers are used to support the substrate. The spacer is usually arranged at a position corresponding to the respective scan line 220 or data line 230. When the spacer slides, there is a possibility of sliding into the pixel region 221. The pixel electrode branch 261 and/or the common electrode branch 271 near the corresponding data line 230 are arranged in the first elongated groove 251, and the first trunk 262 and the second trunk 272 near the respective scan lines 220 are arranged in the third elongated grooves 253, so that the problem of disconnection caused by abrasion or extrusion to the pixel electrode 260 and the common electrode 270 when the spacer slides can be avoided, thereby improving the stability of the array substrate 20.

In addition, each pixel electrode branch 261 and each common electrode branch 271 may also have a V-shaped structure, extending along the extending direction of the data lines 230. When each pixel electrode branch 261 and each common electrode branch 271 have a V-shaped structure, taking the pixel electrode branch 261 as a V-shaped structure as an example, the pixel electrode branch 261 includes a first pixel electrode sub-branch and a second pixel electrode sub-branch, and the angle between the first pixel electrode sub-branch and the second pixel electrode sub-branch is an obtuse angle, and the obtuse angle is set to lie in the range of 150°~166° to ensure the stability of the electric field. Accordingly, the shape of the first elongated groove 251 may be designed according to the shape of the pixel electrode branch 261. Therefore, the shape of the first elongated groove 251 can also be a elongated groove with a V-shaped structure, so that the pixel electrode branch 261 and/or the common electrode branch 271 disposed corresponding to the raised portion 243 can be fully disposed within the first elongated groove 251. Alternatively, the shape of the first elongated groove 251 can also be a rectangle, and only part of the pixel electrode branch 261 and/or the common electrode branch 271 corresponding to the raised portion 243 is arranged in the first elongated groove 251 to ensure that the upper surfaces of the pixel electrode 260 and the common electrode 270 are flush.

Further, the array substrate 20 further includes a second planarization layer 254. The second planarization layer 254 is disposed overlying the pixel electrode 260 and/or the common electrode 270, and the surface of the second planarization layer 254 away from the pixel electrode 260 and/or the common electrode 270 is parallel to the substrate 210.

Since the first elongated groove 251 is provided at the position of the planarization layer 250 corresponding to the pixel electrode branch 261 or the common electrode branch 271, the upper surface of the planarization layer 250 may be uneven, the portion of the planarization layer 250 corresponding to the position where the thickness of the raised portion 243 of the first color filter 241 is relatively large will protrude from the upper surface formed by the pixel electrode branch 261 or the common electrode branch 271. In order to improve the flatness of the array substrate 20, a second planarization layer 254 is further disposed above the pixel electrode 260 and the common electrode 270 to flatten the exposed surface of the array substrate 20, so that the upper surface of the array substrate 20 is optimal, and the problem of light leakage in the dark state of the IPS type display panel 10 can be minimized. Furthermore, the provision of the second planarization layer 254 is also beneficial to the uniform thickness of the liquid crystal layer 40, so that the display effect is more uniform and the image quality is improved.

Embodiment 2

Figure 6:
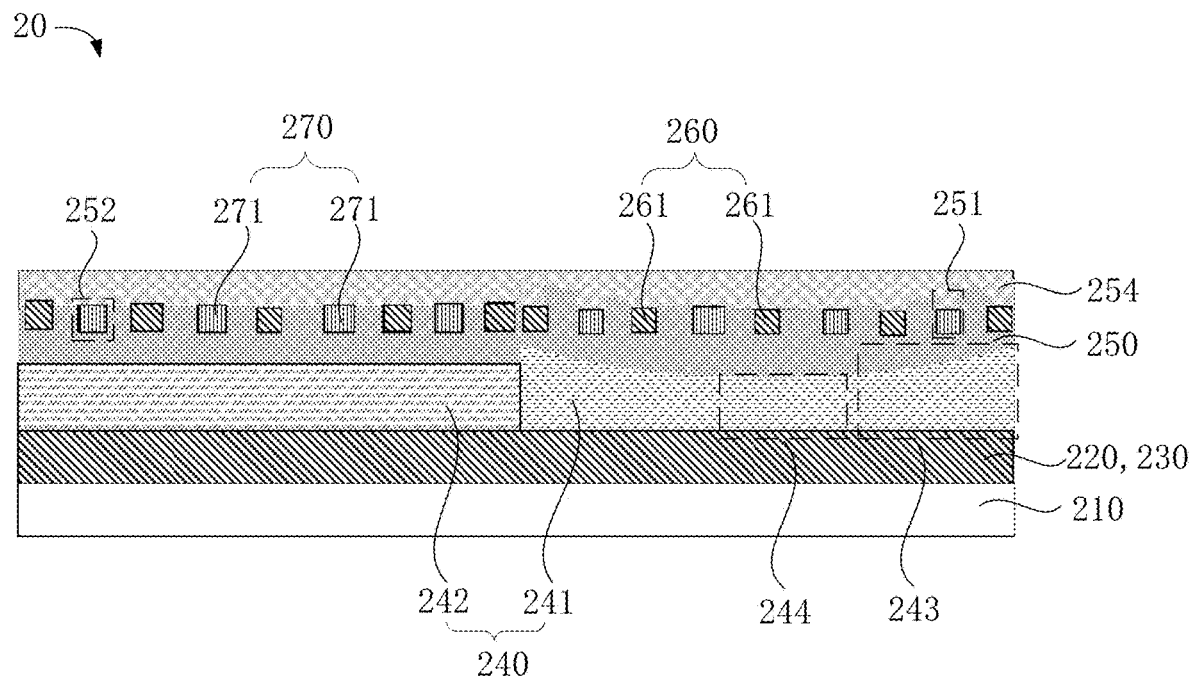
FIG. 6 is a schematic cross-sectional view of an array substrate according to a second embodiment of the present application.
Figure 7:
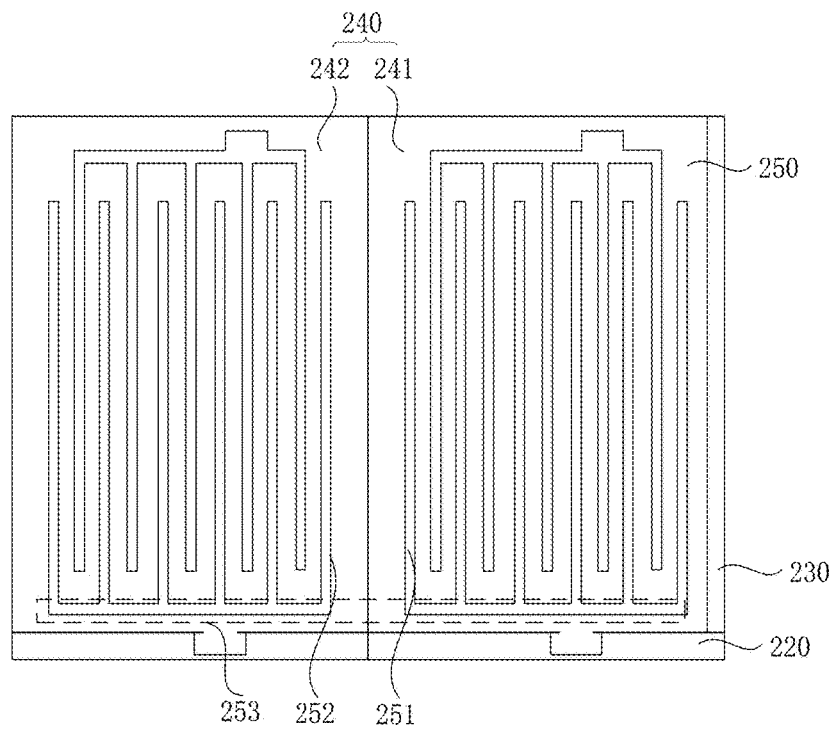
FIG. 7 is a schematic top view of a first elongated groove and a second elongated groove in the second embodiment of the present application.

FIG. 6 is a schematic cross-sectional view of an array substrate according to a second embodiment of the present application. FIG. 7 is a schematic top view of a first elongated groove and a second elongated groove in the second embodiment of the present application. Referring to FIGS. 6 and 7, this embodiment is a further improvement of the first embodiment, where the color filter layer 240 further includes at least one second color filter 242, and the thickness of the second color filter 242 is uniform. The planarization layer 250 is provided with a plurality of second elongated grooves 252 corresponding to the second color filter 242. The second elongated grooves 252 extend along the extending direction of the data lines 230. The depths of the plurality of second elongated grooves 252 are equal, and the pixel electrode branches 261 and/or the common electrode branches 271 corresponding to the second color filter 242 are disposed in the second elongated grooves 252.

In this embodiment, the planarization layer 250 is not only provided with a first elongated groove 251 corresponding to the first color filter 241, but also provided with a second elongated groove 252 corresponding to the position of the second color filter 242. There are a plurality of second elongated grooves 252, and the number of the second elongated grooves 252 is the equal to the number of the pixel electrode branches 261 and/or the common electrode branches 271 corresponding to the second color filter 242. Both the pixel electrode branches 261 and/or the common electrode branches 271 corresponding to the second color filter 242 are arranged in the second elongated grooves 252, so that the upper surfaces of the pixel electrode 260 and the common electrode 270 disposed corresponding to the second color filter 242 are also flush.

In addition, the planarization layer 250 is also provided with at least one first elongated groove 251 corresponding to the middle portion 244. That is, a plurality of first elongated grooves 251 are provided corresponding to the position of the first color filter 241, and the first elongated grooves 251 are provided in the middle portion 244 and the raised portion 243. The number of the first elongated grooves 251 is equal to the number of the pixel electrode branches 261 and/or the common electrode branches 271 provided corresponding to the first color filter 241, so that the pixel electrode branches 261 and the common electrode branches 271 corresponding to the first color filter 241 are both arranged in the first elongated grooves 251. Corresponding to the raised portion 243 of the first color filter 241, the depths of the first elongated grooves 251 gradually increase from the middle portion 244 to the raised portion 243, showing a concave change trend, so that the upper surfaces of the pixel electrode 260 and the common electrode 270 disposed corresponding to the first color filter 241 and the second color filter 242 tend to be flush, thereby improving the stability of the electric field. Furthermore, a third elongated groove 253 may also be provided at the keel position of each of the pixel electrode 260 and the common electrode 270 to ensure that in the array substrate 20, the upper surfaces of the pixel electrode 260 and the common electrode 270 at each position are flush, thus further improving the stability of the array substrate.

In addition, the arrangement of the second elongated grooves 252 can also offset the process error created during the fabricating process of the array substrate 20. For example, the position of the second color filter 242 may also have a slight leveling problem, and the surface of the planarization layer 250 corresponding to the position of the second color filter 242 may also be uneven. Accordingly, elongated grooves 260 are provided corresponding to the planarization layer 250 of each color filter, which can reduce the unevenness of the upper surfaces of the pixel electrode 260 and the common electrode 270 caused by the unevenness of the planarization layer 250 and further ensure the stability of the electric field.

In some embodiments, the depth of the second elongated groove 252 is equivalent to the thickness of the pixel electrode branch 261 and/or the common electrode branch 271. Meanwhile, at the first color filter 241, corresponding to the middle portion 244, the depth of the first elongated groove 251 is equivalent to the thickness of the pixel electrode branch 261 and/or the common electrode branch 271. Corresponding to the raised portion 243, the depth of the first elongated groove 251 is greater than the thickness of the pixel electrode branch 261 and/or the common electrode branch 271. The pixel electrode branches 261 and/or the common electrode branches 271 are both disposed in the first elongated grooves 251.

In this embodiment, the depths of the first elongated groove 251 and the second elongated groove 252 are designed in a certain way. Specifically, the depth of the second elongated groove 252 is equivalent to the thickness of the pixel electrode branch 261 or the common electrode branch 271. They can be equal to or have a certain error, as long as it lies within the allowable range. Corresponding to the middle portion of the first color filter 241, the depth of the first elongated groove 251 is equivalent to the thickness of the pixel electrode branch 261 or the common electrode branch 271. From the middle portion 244 to the raised portion 243, the depths of the first elongated grooves 251 gradually increase, and are larger than the thickness of the pixel electrode branch 261 or the common electrode branch 271, which is beneficial to the upper surfaces of all the pixel electrode branches 261 and the common electrode branch 271 being flush. Corresponding to the positions of the first color filter 241 and the second color filter 242, the pixel electrode branches 261 or the common electrode branches 271 are both located in the planarization layer 250, which can optimize the vertical component of the electric field and reduce the dark state brightness. While ensuring the stability of the electric field, the thickness of the liquid crystal cell is made more uniform, so that the uniformity of light transmittance is improved.

Of course, the depth of the second elongated groove 252 can also be less or greater than the thickness of the pixel electrode branch 261 and/or the common electrode branch 271, while the depth of the first elongated groove 251 corresponding to the middle portion 244 can be equal to the depth of the second elongated groove 252 to ensure that the upper surfaces of the pixel electrodes 260 and the common electrodes 270 corresponding to the first color filter 241 and the second color filter 242 are flush, thereby improving the stability of the electric field.

Embodiment 3

Figure 8:
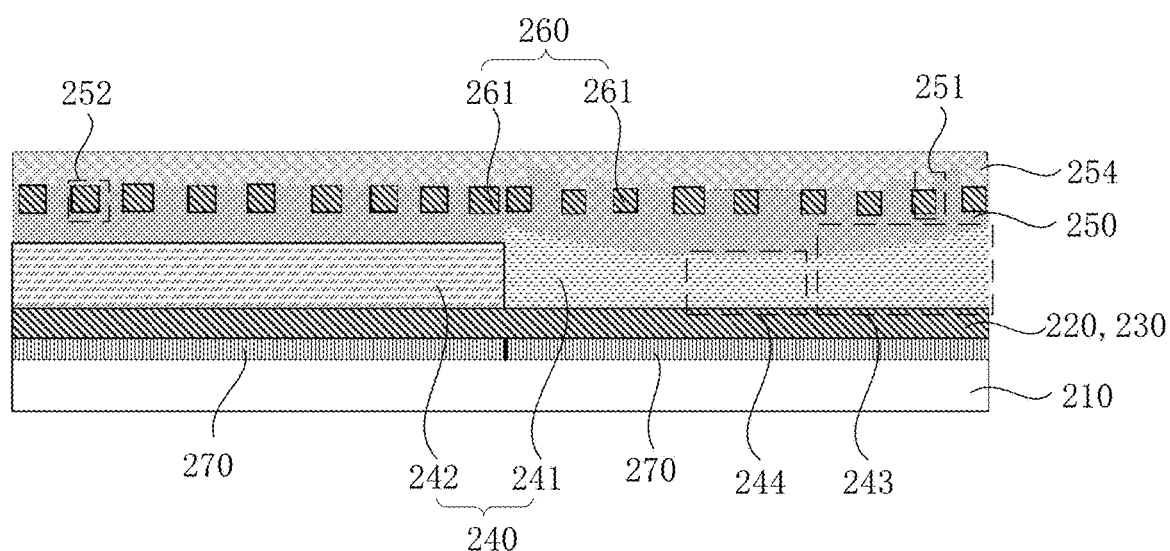
FIG. 8 is a schematic cross-sectional view of a third array substrate according to the embodiment of the present application.

FIG. 8 is a schematic cross-sectional view of an array substrate according to a third embodiment of the present application. As illustrated in FIG. 8, as the third embodiment of the present application, the display panel 10 is different from the first embodiment in that the display panel 10 is a fringe field switching technology (FFS) display panel. One of the pixel electrode 260 and the common electrode 270 is disposed on the planarization layer 250. The other one of the pixel electrode 260 and the common electrode 270 is an integral single electrode, and is disposed between the substrate 210 and the color filter layer 240. The pixel electrode 260 and the common electrode 270 form a fringe electric field. The pixel electrode branches 261 or the common electrode branches 271 disposed corresponding to the raised portion 243 is disposed in the first elongated groove 251.

In this embodiment, the display panel 10 is an FFS display panel, and the pixel electrode 260 and the common electrode 270 are located in different layers of the array substrate 20. Taking the pixel electrode 260 disposed on the planarization layer 250 as an example, the common electrode 270 is disposed between the substrate 210 and the color filter layer 240. The pixel electrode 260 includes a plurality of pixel electrode branches 261, which are arranged on the planarization layer 250 at intervals. The common electrode 270 is a single integral electrode, and forms a fringe electric field with the pixel electrode 260. Therefore, the first elongated groove 251 only accommodates the respective pixel electrode branch 261 to ensure that the upper surface of the pixel electrode 260 is flush. Furthermore, the shape of the first elongated groove 251 is correspondingly designed according to the shape of the pixel electrode branch 261 to improve the stability of the array substrate 20.

In addition, a second elongated groove 252 can also be provided corresponding to the position of the second color filter 242. A second planarization layer 254 may also be provided on the pixel electrode 260. While ensuring that the upper surfaces of the respective pixel electrode branches 261 are flush so that the electric field is stable to reduce light leakage in the dark state, the uniformity of light transmittance can also be improved, thereby further improving the stability of the display panel 10.

Figure 9:
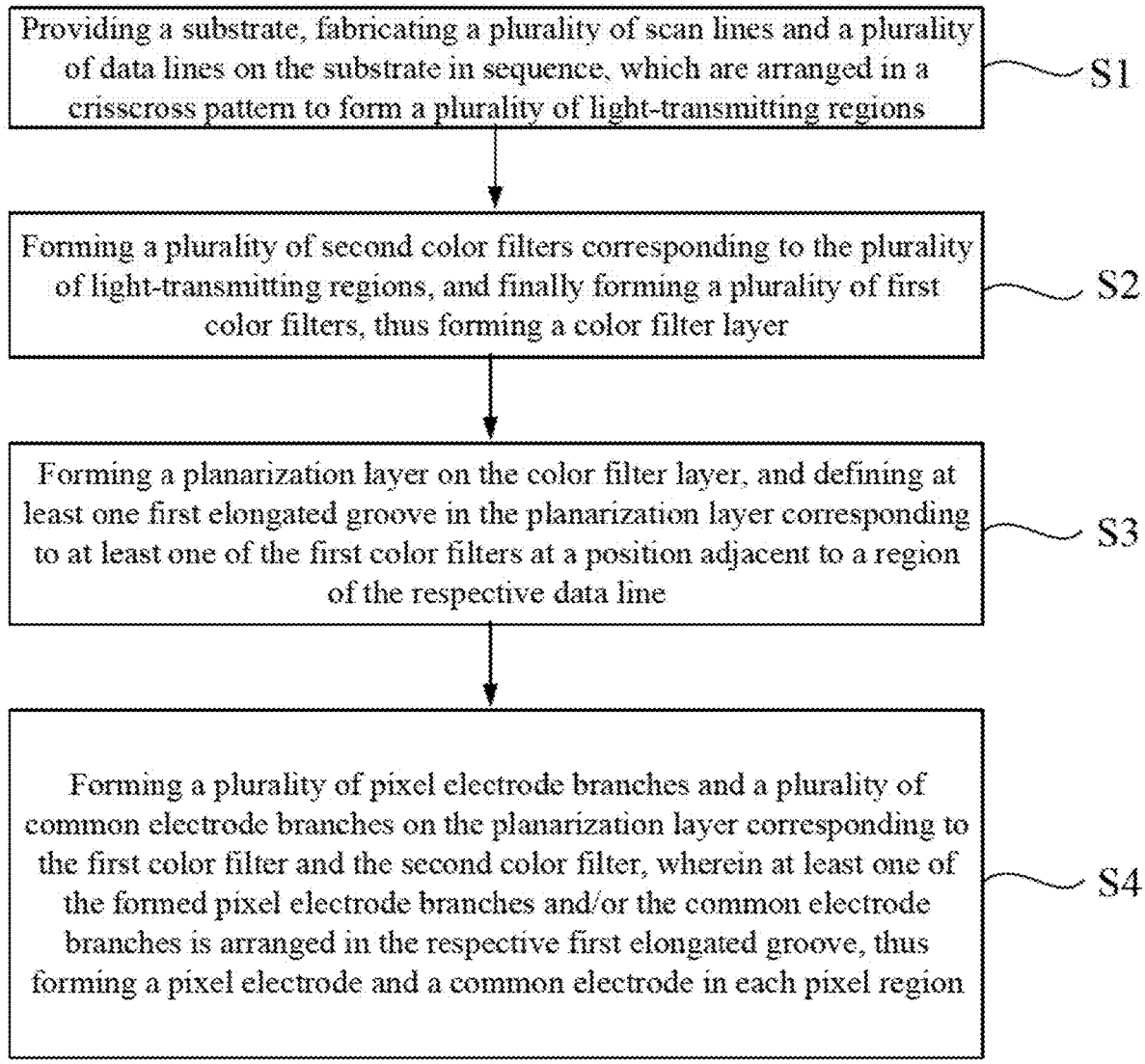
FIG. 9 is a flowchart of a method of fabricating an array substrate according to the present application.

FIG. 9 is a flowchart of a method of fabricating an array substrate according to the present application. Referring to FIG. 9, as another embodiment of the present application, a method of fabricating an array substrate 20 is further disclosed, which is used to fabricate any array substrate 20 disclosed in the present application, including the following steps:

S1, providing a substrate, sequentially fabricating a plurality of scan lines and a plurality of data lines on the substrate, which are arranged in a crisscross pattern to form a plurality of pixel regions;

S2, forming a plurality of second color filters corresponding to the pixel regions, and finally forming a plurality of first color filters, thus forming a color filter layer;

S3, forming a planarization layer on the color filter layer, and defining at least one first elongated groove in the planarization layer corresponding to at least one of the first color filters near the respective data line area; and S4, forming a plurality of pixel electrode branches and a plurality of common electrode branches corresponding to the first color filter and the second color filter on the planarization layer, where at least one of the formed pixel electrode branches and/or the common electrode branches is arranged in the first elongated groove to form a pixel electrode and a common electrode in the each pixel region.

FIGS. 9a-9d are schematic diagrams showing the structural changes of the array substrate.

Figure 9A:
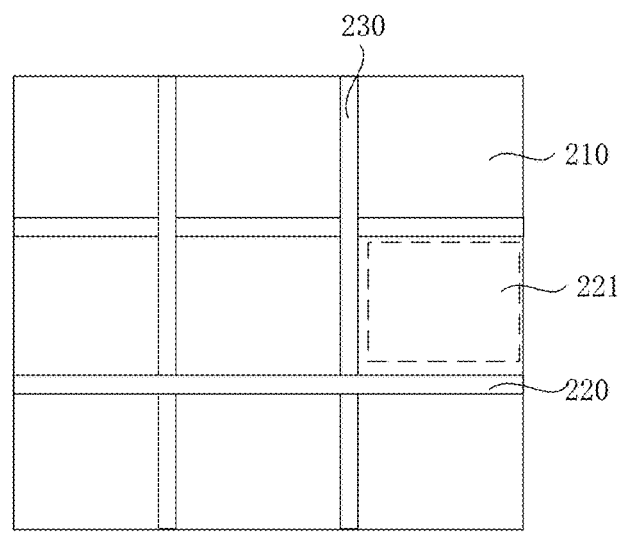
FIGS. 9a-9e are schematic diagrams of structural changes of an array substrate according to the present application.

FIG. 9a is a schematic diagram of a first stage of the array substrate of the present application. Referring to FIG. 9a, through a series of processes such as film formation, yellow light, etching, etc., a plurality of scan lines 220 and a plurality of data lines 230 are sequentially formed on the substrate 210, which are arranged in a crisscross pattern to form a plurality of pixel regions 221.

Figure 9B:
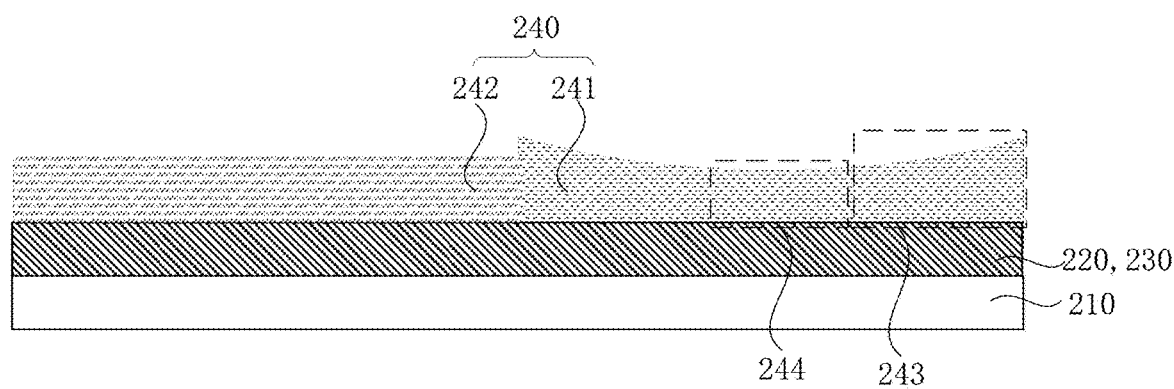

FIG. 9b is a schematic diagram of a second stage of the array substrate of the present application. Referring to FIG. 9b, at the corresponding pixel region 221, a plurality of second color filters 242 are sequentially formed through a yellow light process, and finally a plurality of first color filters 241 are formed thereby forming a color filter layer 240. In addition, the formed first color filter 241 has a raised portion 243 at a position adjacent to the respective data line, and has a middle portion 244 at a position away from the respective data line, and the thickness of the middle portion 244 is smaller than that of the raised portion 243. Along the extension direction of the scan line, the first color filter 241 presents a concave structure with a lower middle and higher sides. Generally, the thickness of the raised portion 243 is larger than that of the middle portion 244 by 0.2 um-0.5 um.

Figure 9C:
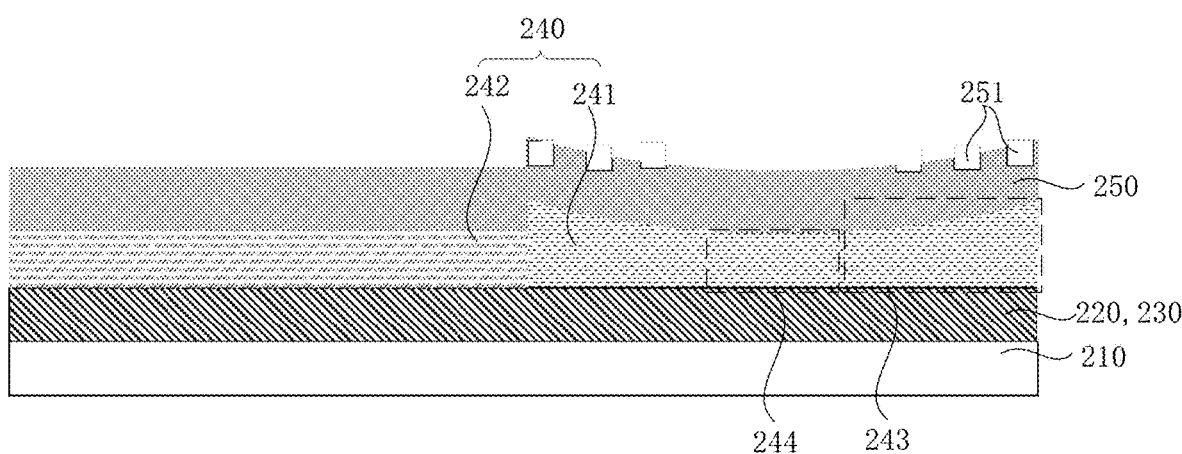

FIG. 9c is a schematic diagram of a third stage of the array substrate of the present application. Referring to FIG. 9c, on the color filter layer 240, a mask technology, such as a halftone mask, or an ashing process, is used to form a planarization layer 250. At least one first elongated groove 251 is defined at a position adjacent to the respective data line 230 corresponding to the at least one first color filter 241. The first elongated groove 251 is only provided at the positions where the thickness of the first color filter 241 is large. Of course, there may also be a plurality of first elongated grooves 251, and the depths of the plurality of first elongated grooves 251 gradually increase in the direction from the position corresponding to the middle portion 244 of the first color filter 241 to the position corresponding to the raised portion 243 of the first color filter 241.

Figure 9D:
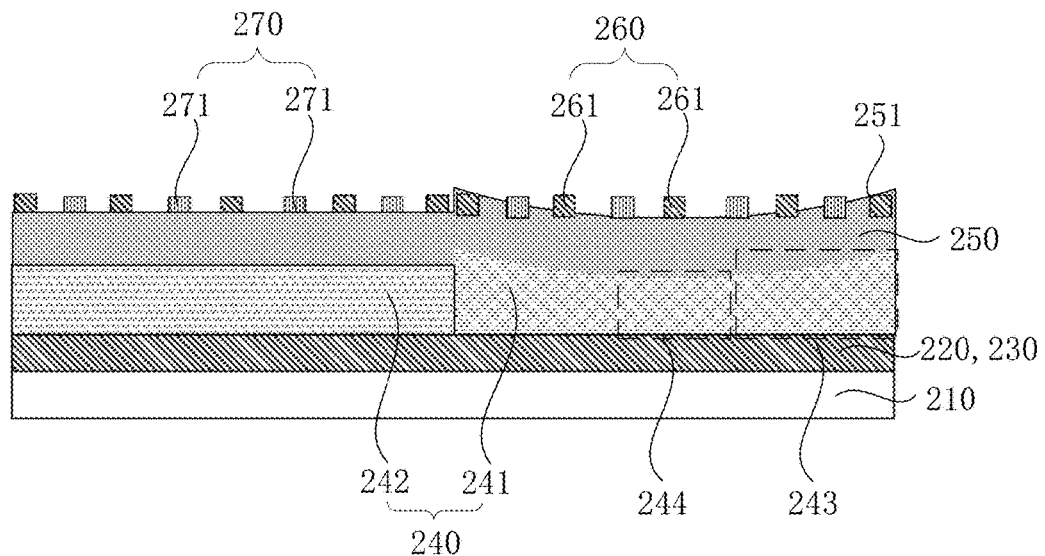

FIG. 9d is a schematic diagram of a fourth stage of the array substrate of the present application. Referring to FIG. 9d, it can be known that on the planarization layer 250, the pixel electrode 260 and the common electrode 270 are formed by film formation, yellow light, etching, etc. Corresponding to the position of the first color filter 241, at least one pixel electrode branch 261 or common electrode branch 271 is arranged in the first elongated groove 251, so that the upper surfaces of the pixel electrode 260 and the common electrode 270 are flush, thereby improving the stability of the electric field. The pixel electrode 260 and the common electrode 270 can be patterned to form a comb-like structure or a V-shaped structure to form a horizontal electric field.

Specifically, step S3 may further include: forming a plurality of first elongated grooves in the planarization layer corresponding to the first color filter; at the same time, forming a plurality of second elongated grooves corresponding to the second color filter.

Step S4 further includes: forming a plurality of pixel electrode branches and a plurality of common electrode branches on the planarization layer corresponding to the position of the second color filter, and the plurality of pixel electrode branches and the plurality of common electrode branches are formed in the respective second elongated grooves.

Figure 9E:
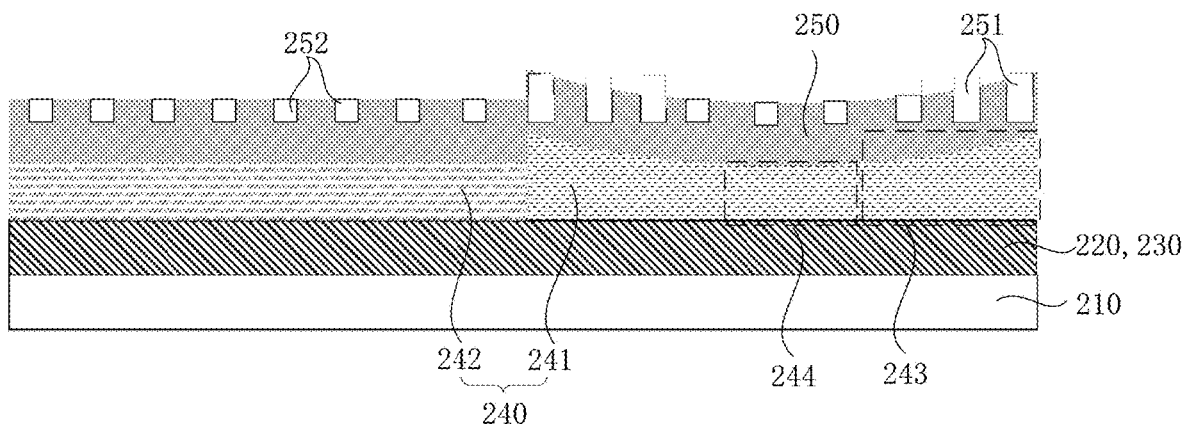

FIG. 9e is a schematic diagram of another structure of a third stage of the array substrate of the present application. As shown in FIG. 9e, a plurality of second elongated grooves 252 are also formed corresponding to the position of each second color filter 242, and a plurality of first elongated grooves 251 are formed corresponding to the first color filter 241. That is, on the planarization layer 250, a plurality of first elongated grooves 251 and a plurality of second elongated grooves 252 are respectively provided corresponding to the first color filter 241 and the second color filter 242. The depth of each second elongated groove 252 is the same, and the depths of the first elongated grooves 251 gradually increase from the middle position of the first color filter 241 to the edge position of the first color filter 241.

In addition, when step S4 is performed, the pixel electrode branch 261 and/or the common electrode branch 271 corresponding to the position of the second color filter 242 are also arranged in the respective second elongated grooves 252, to avoid the phenomenon that the upper surface of the planarization layer 250 is not flat due to the leveling property of other color filters so that the upper surfaces of the pixel electrode branch 261 and/or the common electrode branch 271 at the corresponding position is not flat. As a result, the stability of the electric field of the array substrate 20 is further improved.

In step S3, different shapes of the first elongated groove 251 and/or the second elongated groove 252 may be formed by a patterning process, which may be a elongated rectangle or a zigzag line or a bending line. Or other shapes may be designed according to the shape of the pixel electrode branch 261 and/or the common electrode branch 271, so as to ensure that the pixel electrode branch 261 and the common electrode branch 271 formed in step S4 can all be arranged in the first elongated groove 251 and the second elongated groove 252 thereby ensuring that the upper surfaces of the pixel electrode 260 and the common electrode 270 are flush.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels, which are all applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. An array substrate, applied to a display panel, wherein the array substrate comprises a substrate, a plurality of scan lines, a plurality of data lines, a color filter layer, and a planarization layer;

wherein the plurality of scan lines and the plurality of data lines are disposed on the substrate and are arranged in a crisscross pattern to form a plurality of pixel regions;

wherein the color filter layer comprises a plurality of color filters of different colors and is disposed corresponding to the plurality of pixel regions, respectively;

wherein the planarization layer is disposed on the color filter layer;

wherein each of the plurality of pixel regions further comprises a pixel electrode and a common electrode, wherein at least one of the pixel electrode and the common electrode are both disposed on the planarization layer, and wherein the pixel electrode comprises a plurality of pixel electrode branches that are connected to each other and arranged at intervals, and wherein the common electrode comprises a plurality of common electrode branches that are connected to each other and arranged at intervals; wherein the plurality of pixel electrode branches are alternately arranged with the plurality of common electrode branches;

wherein the color filter layer comprises at least a plurality of first color filters, wherein at least one of the first color filters comprises a raised portion in a region that is located at each of both sides of the first color filter and that is relatively adjacent to the respective data line, and a middle portion in a region that is located at a center of the first color filter and that is relatively farther away from the respective data line; and wherein a thickness of the raised portion is greater than a thickness of the middle portion;

wherein the planarization layer defines at least one first elongated groove at a position corresponding to the raised portion, wherein the first elongated groove extends along an extending direction of each of the plurality of data lines, and wherein at least one pixel electrode branch and at least one common electrode are disposed in the respective first elongated grooves so that upper surfaces of the plurality of pixel electrode branches and the plurality of common electrode branches are all flush with each other.

2. The array substrate of claim 1, wherein there are defined a plurality of first elongated grooves, and wherein depths of the plurality of first elongated grooves gradually decrease in a direction from the raised portion to the middle portion, and wherein the pixel electrode braches and the common electrode branches disposed corresponding to the raised portion are arranged in the respective first elongated grooves.

3. The array substrate of claim 1, wherein the planarization layer further defines at least one first elongated groove at a position corresponding to the middle portion, and wherein a depth of the first elongated groove corresponding to the raised portion is greater than a thickness of the respective pixel electrode branch and the common electrode branch;

wherein the plurality of pixel electrode branches and the plurality of common electrode branches are all disposed in the respective first elongated grooves.

4. The array substrate of claim 1, wherein the color filter layer further comprises at least one second color filter having a uniform thickness;

wherein the planarization layer defines a plurality of second elongated grooves corresponding to the second color filter, wherein the second elongated grooves extend along an extending direction of each of the plurality of data lines, wherein depths of the plurality of second elongated grooves are equal, and wherein the plurality of pixel electrode branches and the plurality of common electrode branches disposed corresponding to the second color filter are disposed in the respective second elongated grooves.

5. The array substrate of claim 4, wherein a depth of each of the plurality of second elongated grooves is equal to a thickness of the pixel electrode branch and the common electrode branch.

6. The array substrate of claim 1, wherein the display panel is an in-plane switching type display panel, and the pixel electrode and the common electrode are both disposed on the planarization layer, and wherein the plurality of pixel electrode branches and the plurality of common electrode branches are alternately arranged at intervals to form a horizontal electric field;

wherein at least one pixel electrode branch and at least one common electrode branch disposed corresponding to the raised portion are disposed in the respective first elongated grooves.

7. The array substrate of claim 1, further comprising a second planarization layer disposed overlying the pixel electrode and the common electrode, and wherein a surface of the second planarization layer facing away from the pixel electrode and the common electrode is parallel to the substrate.

8. The array substrate of claim 1, wherein the first color filter is a color filter formed in a last process in manufacturing the color filter layer.

9. The array substrate of claim 8, wherein the first color filter is a blue color filter.

10. The array substrate of claim 1, wherein a width of the at least one first elongated groove is greater than a width of the respective pixel electrode branch and a width of the respective common electrode branch by 2 um-15 um.

11. The array substrate of claim 1, wherein each of the pixel electrodes and the common electrodes is arranged in a comb shape, wherein the pixel electrode further comprises a first trunk, and the plurality of pixel electrode branches are connected to the first trunk, and wherein the first trunk extends along an extending direction of the plurality of scan lines; wherein the common electrode further comprises a second trunk, and the plurality of common electrode branches are connected to the second trunk, and wherein the second trunk extends along an extending direction of the plurality of scan lines;

wherein the planarization layer further defines a third elongated groove at a position adjacent to the respective scan line, and wherein the third elongated groove extends along an extending direction of the respective scan line; and wherein the first trunk and the second trunk, which are arranged at a position corresponding to a relatively larger thickness of the color filter, are each arranged in the third elongated groove.

12. The array substrate of claim 1, wherein the pixel electrode branch comprises a first pixel electrode sub-branch and a second pixel electrode sub-branch, and an included angle formed between the first pixel electrode sub-branch and the second pixel electrode sub-branch is an obtuse angle.

13. A display panel, comprising an counter substrate and an array substrate, wherein the counter substrate and the array substrate are aligned and bonded together to form a cell; wherein the array substrate comprises a substrate, a plurality of scan lines, a plurality of data lines, a color filter layer, and a planarization layer;

wherein the plurality of scan lines and the plurality of data lines are disposed on the substrate and are arranged in a crisscross pattern to form a plurality of pixel regions;

wherein the color filter layer comprises a plurality of color filters of different colors and is disposed corresponding to the plurality of pixel regions, respectively;

wherein the planarization layer is disposed on the color filter layer;

wherein each of the plurality of pixel regions further comprises a pixel electrode and a common electrode, wherein the pixel electrode and the common electrode are disposed on the planarization layer, and wherein the pixel electrode comprises a plurality of pixel electrode branches that are connected to each other and arranged at intervals, and wherein the common electrode comprises a plurality of common electrode branches that are connected to each other and arranged at intervals; wherein the plurality of pixel electrode branches are alternately arranged with the plurality of common electrode branches;

wherein the color filter layer comprises at least a plurality of first color filters, wherein at least one of the first color filters comprises a raised portion in a region that is located at each of both sides of the first color filter and that is relatively adjacent to the respective data line, and a middle portion in a region that is located at a center of the first color filter and that is relatively farther away from the respective data line; and wherein a thickness of the raised portion is greater than a thickness of the middle portion;

wherein the planarization layer defines at least one first elongated groove at a position corresponding to the raised portion, wherein the first elongated groove extends along an extending direction of each of the plurality of data lines, and wherein at least one pixel electrode branch and at least one common electrode branch are disposed in the respective first elongated grooves so that upper surfaces of the plurality of pixel electrode branches and the plurality of common electrode branches are all flush with each other.

14. A method of fabricating an array substrate, the method comprising:

providing a substrate, fabricating a plurality of scan lines and a plurality of data lines on the substrate in sequence, wherein the plurality of scan lines and the plurality of data lines are arranged in a crisscross pattern to form a plurality of pixel regions;

forming a plurality of second color filters, and finally forming a plurality of first color filters corresponding to the plurality of pixel regions, respectively, thus forming a color filter layer; wherein the at least one of the plurality of first color filters comprises a raised portion in a region that is located at each of both sides of the first color filter and that is relatively adjacent to the respective data line, and a middle portion in a region that is located at a center of the first color filter and that is relatively farther away from the respective data line; and wherein a thickness of the raised portion is greater than a thickness of the middle portion; wherein along an extending direction of the plurality of scan lines, the first color filter has a concave structure with a lower middle and higher sides forming a planarization layer on the color filter layer, and defining at least one first elongated groove in the planarization layer corresponding to the raised portion of at least one of the first color filters; wherein the at least one first elongated groove extends along an extending direction of each of the plurality of data lines; and forming a plurality of pixel electrode branches and a plurality of common electrode branches on the planarization layer corresponding to each of the first color filter and the second color filter, wherein at least one of the formed pixel electrode branches and at least one of the common electrode branches are arranged in the respective first elongated grooves, thus forming a pixel electrode and a common electrode in each pixel region; wherein the plurality of pixel electrode branches are alternately arranged with the plurality of common electrode branches; wherein upper surfaces of the plurality of pixel electrode branches and the plurality of common electrode branches are all flush with each other.

15. The method of claim 14, wherein a thickness of the raised portion is larger than that of the middle portion by 0.2 um-0.5 um.

16. The method of claim 14, wherein the operation of forming the planarization layer on the color filter layer and defining at least one first elongated groove in the planarization layer corresponding to the raised portion of at least one of the first color filters further comprises:

defining a plurality of first elongated grooves in the planarization layer corresponding to the first color filter, and simultaneously defining a plurality second elongated grooves in the planarization layer corresponding to the second color filter.

17. The method of claim 16, wherein the operation of forming a plurality of pixel electrode branches and a plurality of common electrode branches on the planarization layer corresponding to each of the first color filter and the second color filter wherein at least one of the formed pixel electrode branches and at least one of the common electrode branches are arranged in the respective first elongated grooves thus forming a pixel electrode and a common electrode in each pixel region further comprises:

forming a plurality of pixel electrode branches and a plurality of common electrode branches on the planarization layer corresponding to the position of the second color filter, wherein the plurality of pixel electrode branches and the plurality of common electrode branches are formed in the respective second elongated grooves.

\* \* \* \* \*